US010353786B2

(12) United States Patent
Yushina

(10) Patent No.: US 10,353,786 B2
(45) Date of Patent: Jul. 16, 2019

(54) VIRTUALIZATION SUBSTRATE MANAGEMENT DEVICE, VIRTUALIZATION SUBSTRATE MANAGEMENT SYSTEM, VIRTUALIZATION SUBSTRATE MANAGEMENT METHOD, AND RECORDING MEDIUM FOR RECORDING VIRTUALIZATION SUBSTRATE MANAGEMENT PROGRAM

(71) Applicant: NEC Corporation, Tokyo (JP)

(72) Inventor: Ryota Yushina, Tokyo (JP)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 15/326,145

(22) PCT Filed: Jul. 17, 2015

(86) PCT No.: PCT/JP2015/003628
§ 371 (c)(1),
(2) Date: Jan. 13, 2017

(87) PCT Pub. No.: WO2016/013199
PCT Pub. Date: Jan. 28, 2016

(65) Prior Publication Data
US 2017/0212815 A1 Jul. 27, 2017

(30) Foreign Application Priority Data
Jul. 22, 2014 (JP) .................................. 2014-148948

(51) Int. Cl.
*G06F 11/20* (2006.01)
*G06F 9/46* (2006.01)
(Continued)

(52) U.S. Cl.
CPC ........ *G06F 11/203* (2013.01); *G06F 9/45558* (2013.01); *G06F 9/46* (2013.01);
(Continued)

(58) Field of Classification Search
CPC .. G06F 11/20; G06F 11/2023; G06F 9/45558; G06F 9/45533; G06F 9/50;
(Continued)

(56) References Cited

U.S. PATENT DOCUMENTS 8,874,952 B2 * 10/2014 Tameshige ............ G06F 9/5077
714/4.1
9,465,639 B2 * 10/2016 Chen ................... G06F 9/45558
(Continued)

FOREIGN PATENT DOCUMENTS

CN 102111303 6/2011
JP 2004-133496 4/2004
(Continued)

OTHER PUBLICATIONS

Japanese Official Action—2016-535788—dated Oct. 31, 2017.
(Continued)

*Primary Examiner* — Nadeem Igbal
(74) *Attorney, Agent, or Firm* — Young & Thompson

(57) ABSTRACT

The disclosed device makes it possible to effectively use a usable physical machine in a computer system for building a virtualization environment. A virtualization infrastructure management device 40 equipped with: a detection unit 41 for detecting the occurrence of an accidental fault which is not a physical persistent fault, in physical machine 50-*i* which is capable of executing virtual machine 51-*i*; a registration unit 42 for registering that physical machine 50-*i* is in standby state, in a management information storage unit 44 for storing the states of physical machines 50-1 to 50-*n*; and an allocation unit 43 for, when a fault occurs in physical machine 50-*j*, re-allocating virtual machine 51-*j* stopped by the fault to any of the physical machines for which the standby state is registered in the management information storage unit 44.

20 Claims, 8 Drawing Sheets

(51) Int. Cl.
    *G06F 9/50*    (2006.01)
    *G06F 9/455*    (2018.01)

(52) U.S. Cl.
    CPC .............. *G06F 9/50* (2013.01); *G06F 9/5077* (2013.01); *G06F 11/20* (2013.01); *G06F 2009/4557* (2013.01); *G06F 2009/45591* (2013.01); *G06F 2201/815* (2013.01)

(58) Field of Classification Search
    CPC ......... G06F 9/4856; G06F 2009/45583; G06F 2009/4557; G06F 2009/45591
    See application file for complete search history.

(56) References Cited

U.S. PATENT DOCUMENTS

| | | | |
|---|---|---|---|
| 2003/0167421 A1* | 9/2003 | Klemm | G06F 9/3861 714/37 |
| 2011/0004791 A1* | 1/2011 | Kokubu | G06F 11/0751 714/57 |
| 2011/0078797 A1* | 3/2011 | Beachem | G06F 21/53 726/25 |
| 2015/0249615 A1* | 9/2015 | Chen | G06F 9/45558 709/226 |
| 2016/0357647 A1* | 12/2016 | Shirai | G06F 9/46 |

FOREIGN PATENT DOCUMENTS

| | | |
|---|---|---|
| JP | 2009-199395 | 9/2009 |
| JP | 2009-217434 | 9/2009 |
| JP | 2012-014674 | 1/2012 |
| JP | 2012-173751 | 9/2012 |
| JP | 2013-210745 | 10/2013 |

OTHER PUBLICATIONS

International Search Report, PCT/JP2015/003628, dated Oct. 20, 2015.
Chinese Office Action for Application No. 201580039881.0, dated Mar. 4, 2019.

* cited by examiner

140 SERVICE MANAGEMENT TABLE

| VIRTUAL MACHINE | RESTORATION PRIORITY INSTRUCTING INFORMATION |
|---|---|
| VIRTUAL MACHINE 21-1 | VALID |
| VIRTUAL MACHINE 21-2 | INVALID |
| ⋮ | ⋮ |
| VIRTUAL MACHINE 21-n | VALID |

VIRTUALIZATION SUBSTRATE MANAGEMENT DEVICE, VIRTUALIZATION SUBSTRATE MANAGEMENT SYSTEM, VIRTUALIZATION SUBSTRATE MANAGEMENT METHOD, AND RECORDING MEDIUM FOR RECORDING VIRTUALIZATION SUBSTRATE MANAGEMENT PROGRAM

TECHNICAL FIELD

The present invention relates to a virtualization infrastructure management device, etc. which manage allocating a virtual machine to a physical machine in a computer system which constructs virtualization environment.

BACKGROUND ART

In recent years, a cloud service such as IaaS (Infrastructure as a Service) has been spread all over the world. In the cloud service, a service business provider provides a computer system which constructs virtualization environment and users build various services by using virtualization machines allocated in the computer system. As an example, ETSI (European Telecommunications Standards Institute) which is a standardization group has discussed a concept, NFV (Network Function Virtualization), and the standardization thereof is gradually spreading. NFV is a method which provides services which communication businesses have provided by using exclusive devices, by virtual machines. In such background, technologies which allocate the virtual machines to use the computer system effectively have been desired.

As an example of such technologies, PTL 1 discloses the device which is capable of re-allocating a virtual machine based on a design policy in a virtualization system in which virtual servers are built by a plurality of physical severs. There is an example of the design policy, that is, "since a virtual server 2 is a standby system server for a virtual server 1, these are not allocated to a same physical server." There is another example of the design policy, "since load of works which is processed by a virtual server 3 and a virtual server 4 is small, these may be allocated in the same physical server."

PTL 2 discloses the virtualization system which continues system operation without reducing the total amount of resource pool when maintenance of a physical machine is carried out, or when a fault occurs in a physical machine. The virtualization system sets up one or more resource pools in which one or more physical machines build (a) virtual machine(s), and a recovery pool which is one shared among resource pools. The virtualization system uses the recovery pool when the physical machine is maintained or when a fault occurs in the physical machine.

CITATION LIST

Patent Literature

[PTL 1] Japanese Patent Application Laid-Open No. 2009-199395
[PTL 2] Japanese Patent Application Laid-Open No. 2013-210745

SUMMARY OF INVENTION

Technical Problem

A general virtualization system includes a plurality of physical machines. A virtual machine which operates in the physical machine provides various services. The virtualization system re-allocates the virtual machine which operates in the physical machine to another physical machine to continue to provide services when a fault occurs in any one of physical machines.

The fault which occurs in the physical machine includes a physical persistent fault related to hardware and an accidental fault which in not a persistent fault. The accidental fault (hereinafter, referred to as "accidental fault") includes, for example, a fault which is caused by software bug included in BIOS (Basic Input/Output System) or OS (Operating System). The accidental fault further may include temporary suspension of power supply to the physical machine, malfunction due to abnormality of temperature, etc.

These accidental faults are not the persistent fault related to hardware, but a fault which can be restored by restarting the physical machine in which a fault occurs. When an occurred fault is an accidental fault, therefore the physical machine in which such fault occurs can be essentially used by restarting. However, the general virtualization system manages the physical machine in which an accidental fault occurs, as a failed machine, and does not use the physical machine until maintenance works of the physical machine are completed. Since the general virtualization system cannot use an essentially usable physical machine, usable physical machines are decreased. The technologies disclosed in PTL 1 and 2 cannot solve this problem.

A main object of the present invention is to provide a virtualization infrastructure device capable of solving the problem.

Solution to Problem

According to one aspect of this disclosure, a virtualization infrastructure management device of the present invention includes detection means for detecting occurrence of an accidental fault which is not a physical persistent fault, in a first physical machine included in one or more physical machines which are capable of executing one or more virtual machines, registration means for, when the detection unit detects the accidental fault, registering that the first physical machine is in standby state, in management information storage means for storing states of the physical machines, and allocation means for, when a fault occurs in a second physical machine of the one or more physical machines, re-allocating the virtual machine stopped by the fault to any of the physical machines for which the standby state is registered in the management information storage means.

In another viewpoint achieving the above object, a virtualization infrastructure management method of the present invention in another aspect includes detecting occurrence of an accidental fault which is not a physical persistent fault, in a first physical machine included in one or more physical machines which are capable of executing one or more virtual machines, registering, when the detection unit detects the accidental fault, that the first physical machine is in standby state, in management information storage means for storing states of the physical machines, and, re-allocating, when the detection unit detects the accidental fault, the virtual machine stopped by the fault to any of the physical machines for which the standby state is registered in the management information storage means.

In further another viewpoint achieving the above object, a non-transitory computer readable recording medium of the present invention in another aspect records virtualization infrastructure management program for causing a computer to execute following processes, a detection process to detect occurrence of an accidental fault which is not a physical persistent fault, in a first physical machine included in one or more physical machines which are capable of executing one or more virtual machines, a registration process to register, when the detection unit detects the accidental fault, that the first physical machine is in standby state, in management information storage means for storing states of the physical machines, and an allocation process to re-allocate, when a fault occurs in a second physical machine of the one or more physical machines, the virtual machine stopped by the fault to any of the physical machines for which the standby state is registered in the management information storage means.

Further, the present invention is executable by a computer program recorded in the recording medium.

Advantageous Effects of Invention

The present invention can effectively use a usable physical machine in a computer system constructing virtualization environment.

BRIEF DESCRIPTION OF DRAWINGS

FIG. 1 is a block diagram illustrating a structure of a virtualization infrastructure management device related to a first example embodiment of the present invention.

FIG. 2 is a diagram illustrating an example of a structure of a service management table related to the first example embodiment of the present invention.

DESCRIPTION OF EMBODIMENTS

Figure 3:
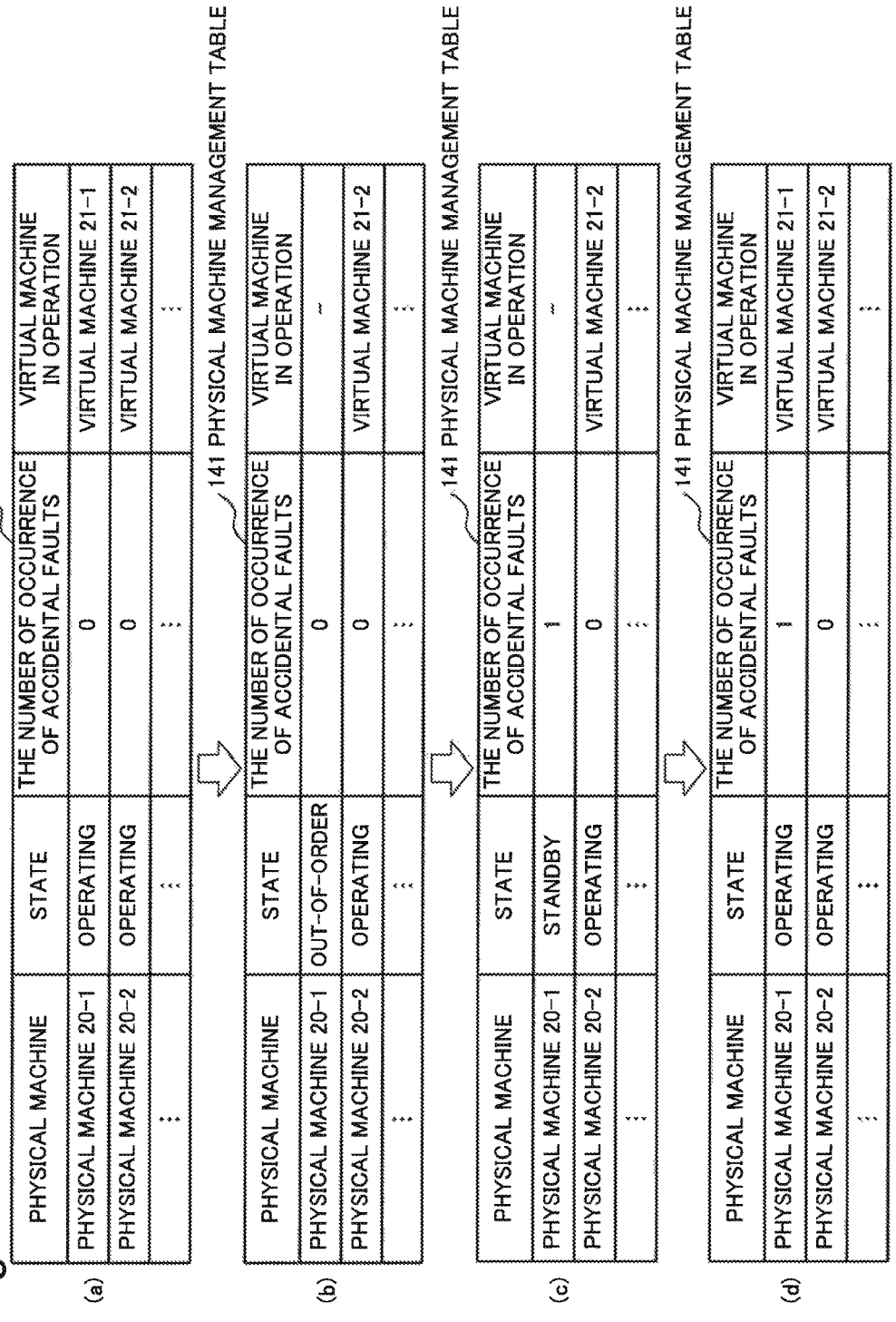
FIG. 3 is a diagram exemplifying a structure of a physical machine management table related to the first example embodiment of the present invention and a flow of renewal of the physical machine management table.

Example embodiments of the present invention are explained in detail by referring to drawings.

First Example Embodiment

Figure 1:
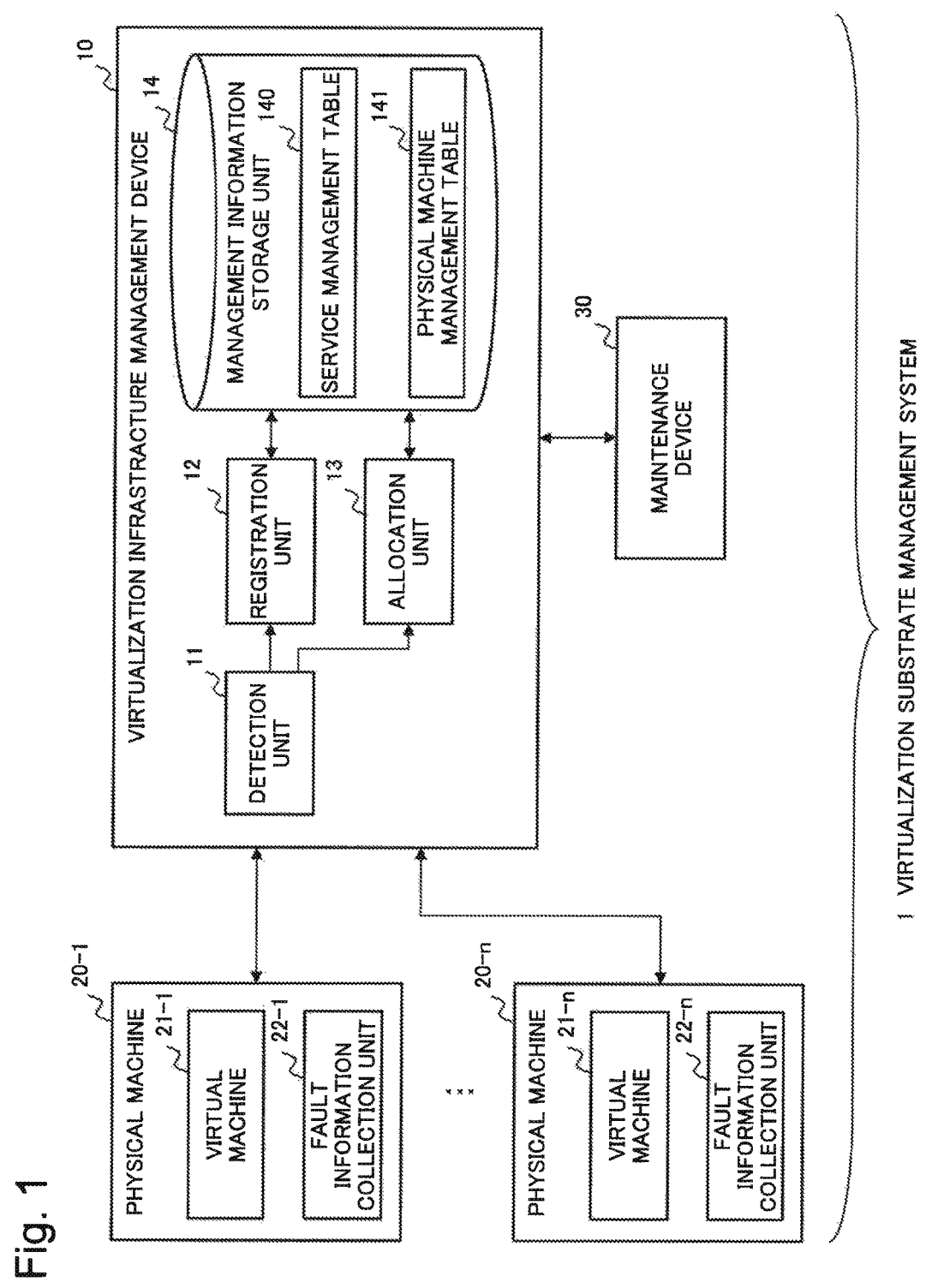

FIG. 1 is a block diagram conceptually illustrating a structure of a virtualization infrastructure management system 1 related to a first example embodiment. The virtualization infrastructure management system 1 related to the example embodiment includes a virtualization infrastructure management device 10, n pieces (n is an integer which is equal to two or more than two) of physical machines 20-1 to 20-n, and a maintenance device 30.

The virtualization infrastructure management device 10, the physical machines 20-1 to 20-n, and the maintenance device 30 are connected to be able to communicate to each other. These constituents perform communication by using, for example, HTML (Hyper Text Markup Language) or XML (eXtensible Text Markup Language).

The maintenance device 30 is a device which manages a maintenance function in the virtualization infrastructure management system 1, and is a device like an OSS (Operation Support System).

The physical machines 20-1 to 20-n are multipurpose server devices having, for example, Linux (registered trademark) KVM (Kernel-based Virtual Machine) and IPMI (Intelligent Platform Management Interface). The physical machines 20-1 to 20n may have NFV. Each of the physical machines 20-1 to 20n may be physically independent server device with a discrete housing or a discrete module. The physical machines 20-1 to 20n may be virtually constructed server devices to which a part of resource like a CPU (Central Processing Unit), memory, and a disc device, etc. is allocated.

As shown in FIG. 1, the physical machine 20-1 drives a virtual machine 21-1, and includes a fault information collection unit 22-1. The physical machines 20-2 to 20n also drives virtual machines 21-2 to 21-n, and also includes fault information collection units 22-2 to 22-n. The physical machines 20-1 to 20n may drive a plurality of virtual machines. When a fault occurs in the physical machines 20-1 (20-2 to 20n), the fault information collection unit 22-1 (22-2 to 22-n) collects information on an occurring fault and transmits the collected information on the fault to the virtualization infrastructure management device 10.

The virtualization infrastructure management device 10 includes a function of allocating a virtual machine to the physical machines 20-1 to 20n. The virtualization infrastructure management device 10 is, for example, NFV_Management_and_Orchestration which is defined in NFV standard. The virtualization infrastructure management device 10 includes a detection unit 11, a registration unit 12, an allocation unit 13, and a management information storage unit 14. The detection unit 11, the registration unit 12, and the allocation unit 13 may be an electronic circuit or may be realized by a computer program and a processor executed by the computer program. The management information storage unit 14 is a storage device like memory or a magnetic disc, etc.

The detection unit 11 receives information on a fault which occurs in a physical machine 20-i from a fault information collection unit 22-i in the physical machine 20-i (i is an integer which is any one of 1 to n). The detection unit 11 detects that an accidental fault occurs in the physical machine 20-i, based on the received information on the fault. If the information on the fault indicates a hardware fault whose restoration is impossible, like a 2-bit error of memory included in the physical machine 20-i, the detection unit 11 determines that the occurred fault is a persistent fault. While on the other hand, if the fault information indicates one of following cases, the detection unit 11 determines that the occurred fault is an accidental fault.

fault which occurs due to software bugs temporary stop of power supply to the physical machine 20-i malfunction caused by abnormality of temperature in any spot in the physical machine 20-*i*.

The detection unit 11 notices the registration unit 12 and the allocation unit 13 of occurrence of the persistent fault or the accidental fault in the physical machine 20-*i*.

When receiving the notice that a fault occurs in the physical machine 20-*i*, the registration unit 12 renews information stored in the management information storage unit 14, based on the received matter. The management information storage unit 14 stores, as shown in FIG. 1, a service management table 140 and a physical machine management table 141.

FIG. 2 is a diagram exemplifying a structure of the service management table 140. The service management table 140 includes a record which associates an identifier which is capable of identifying a virtual machine with restoration priority instructing information. The restoration priority instructing information is information which indicates whether to give priority to quickly restoring the virtual machine 21-*i* and continuing service provided by the virtual machine 21-*i*, when the virtual machine 21-*i* is stopped due to a fault. If the restoration priority instructing information is invalid, the restoration priority instructing information indicates that reliable offer of the service is prior to quick restoration of the virtual machine 21-*i* so that service provided by the virtual machine 21-*i* will be not stopped again. A system administrator, or the like who manages the virtualization infrastructure management system 1 sets, in advance, information representing a numerical value or a letter in the service management table 140.

FIG. 3 is a diagram exemplifying a structure of the physical machine management table 141. The physical machine management table 141 includes a record which relates between an identifier which is capable of identifying a physical machine, information indicating a state on the physical machine, the number of occurrence of accidental faults, and an identifier which is capable of identifying a virtual machine executed by the physical machine. An arrow in FIG. 3 represents transition of contents of the physical machine management table 141.

Figure 4:
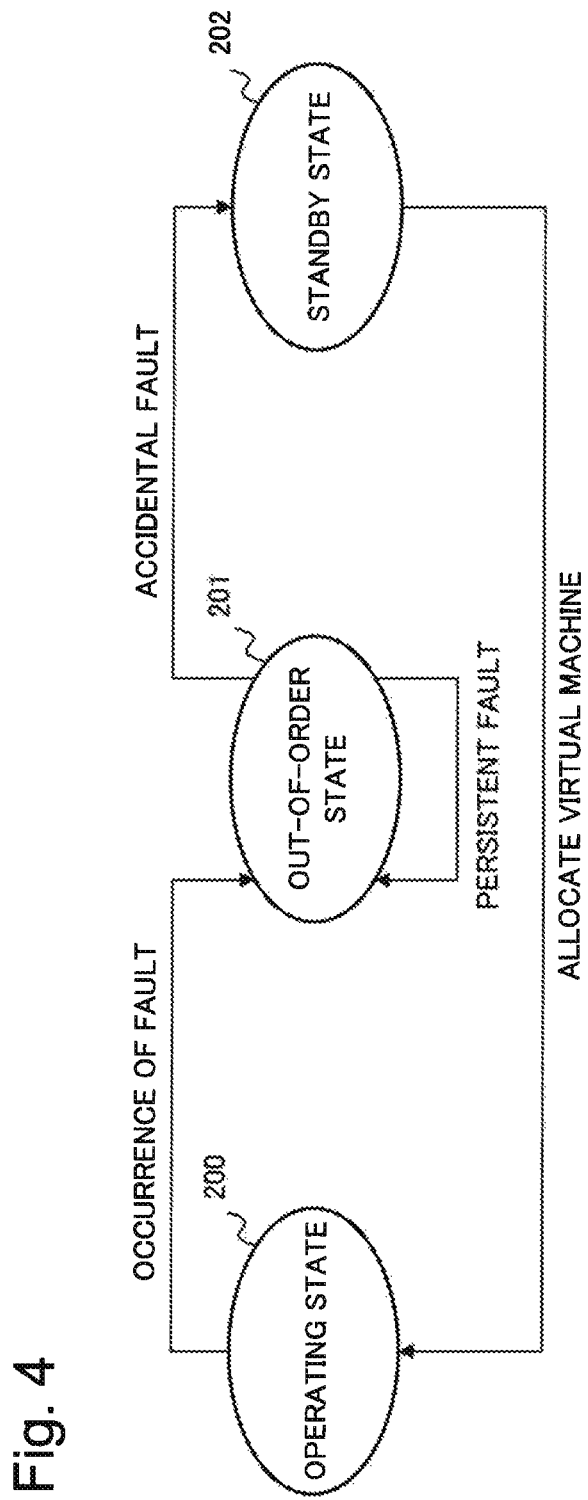
FIG. 4 is a diagram illustrating a state transition diagram related to the physical machine of the first example embodiment of the present invention.

In the example embodiment, the physical machines 20-1 to 20*n* have three states, "operating", "out-of-order", and "standby". FIG. 4 illustrates a state transition diagram related to the physical machines 20-1 to 20*n* of the example embodiment.

As shown in FIG. 4, when a fault occurs in an operating state 200 in which the physical machine 20-*i* runs the virtual machine 21-*i*, the physical machine 20-*i* becomes an out-of-order state 201 which is a state which is stopped due to the fault. If the occurring fault is a persistent fault, the physical machine 20-*i* maintains the out-of-order state 201. If an occurring fault is an accidental fault, the physical machine 20-*i* becomes a standby state 202 which is a state in which restart is waited for. When the virtualization infrastructure management device 10 allocates a virtual machine 21-*j* (j is an integer which is any one of 1 to n) to the physical machine 20-*i* which is in the standby state 202, the physical machine 20-*i* which is in the standby state 202 starts the virtual machine 21-*j* and becomes the operating state 200.

An operation is described below, in which the registration unit 12 renews the physical machine management table 141 when an accidental fault occurs in the physical machine 20-1 when the physical machine 20-1 is in a state indicated by the physical machine management table 141 shown in FIG. 3 (*a*). As shown in FIG. 3 (*b*), the registration unit 12 changes a state from "operating" into "out-of-order" with respect to the physical machine 20-1, and clears an identifier which is capable of identifying the virtual machine 21-1 which is registered as a virtual machine in operation.

As shown in FIG. 3 (*c*), the registration unit 12 sets a value indicated by the number of occurrence of accidental faults to "1" by adding one thereto, and changes the state from "out-of-order" into "standby" with respect to the physical machine 20-1. After that, the allocation unit 13 re-allocates the stopped virtual machine 21-1 to the physical machine 20-1, and the physical machine 20-1 starts the virtual machine 21-1. Next, as shown in FIG. 3 (*d*), the registration unit 12 changes the state from "standby" into "operating" with respect to the physical machine 20-1, and registers the virtual machine 21-1 as a virtual machine in operation.

When receiving that a fault occurs in the physical machine 20-*i*, the allocation unit 13 allocates the virtual machine 21-*i* which is stopped due to the fault to a physical machine 20-*j* based on received contents, the service management table 140, and the physical machine management table 141.

Here, a case is considered, in which an accidental fault occurs in the physical machine 20-1, contents of the service management table 140 is indicated in FIG. 2, and contents of the physical machine management table 141 is indicated in FIG. 3 (*c*). In this case, an operation is explained below, in which the allocation unit 13 allocates a stopped virtual machine 21-1 to a physical machine 20-*j*.

The allocation unit 13 refers to the service management table 140, and confirms that a value indicated by the restoration priority instructing information on the stopped virtual machine 21-1 is "valid". The allocation unit 13 is capable of allocating a virtual machine whose value indicated by the restoration priority instructing information is "valid" to a physical machine which has results of occurrence of an accidental fault and whose state is "standby". The allocation unit 13 is not capable of allocating a virtual machine whose value indicated by the restoration priority instructing information is "invalid" to the physical machine which has results of occurrence of an accidental fault and whose state is "standby". In this case, therefore, the allocation unit 13 is capable of allocating the stopped virtual machine 21-1 to the physical machine which has results of occurrence of an accidental fault and whose state is "standby".

The allocation unit 13 refers to the physical machine management table 141 and searches a physical machine whose state is "standby". As shown in FIG. 3 (*c*), if the physical machine 20-1 is in "standby" and a physical machine whose state is "standby" does not exist other than that, the allocation unit 13 re-allocates the stopped virtual machine 21-1 to the physical machine 20-1.

When re-allocating the stopped virtual machine to the physical machine whose state is "standby", the allocation unit 13 may re-allocate the virtual machine to a physical machine whose number of occurrence of accidental faults shown in the physical machine management table 141 satisfies predetermined criteria. The predetermined criteria may be criteria in which the number of occurrence of accidental faults is the fewest (the smallest) among the physical machines 20-1 to 20*n*, or criteria in which the number of occurrence of accidental faults is equal to or less than a predetermined value.

Figure 5:
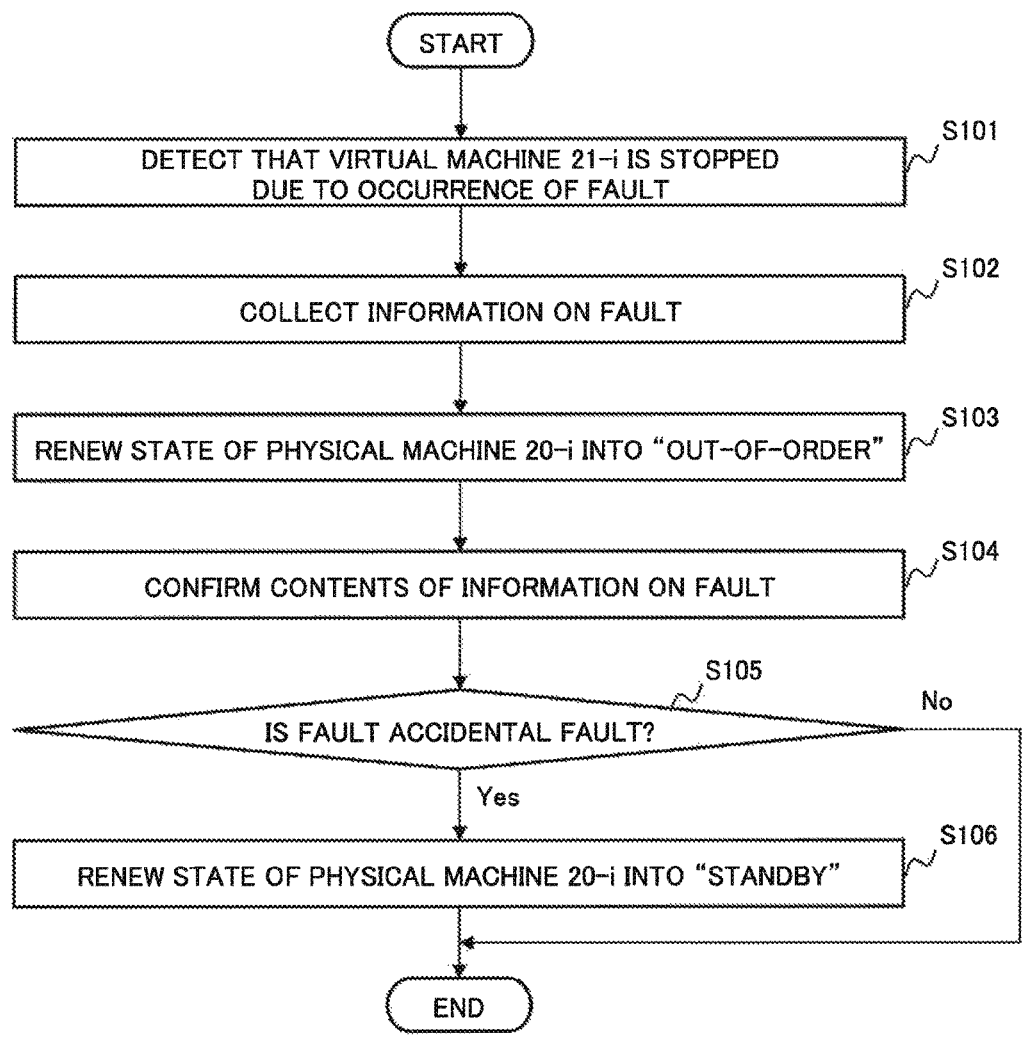
FIG. 5 is a flowchart illustrating an operation in which the virtualization infrastructure management device related to the first example embodiment of the present invention renews the physical machine management table when a fault occurs in the physical machine.

By referring to a flowchart of FIG. 5, an operation (process) is described in detail, in which the virtualization infrastructure management device 10 of the example embodiment renews the physical machine management table 141 when a fault occurs in any one of physical machines.

The fault information collection unit 22-*i* detects that the virtual machine 21-*i* is stopped due to occurrence of a fault in the physical machine 20-*i* (step S101). The fault information collection unit 22-*i* collects information on the occurring fault and transmits the information on the occurring fault to the virtualization infrastructure management device 10 (step S102). The registration unit 12 renews a state of the physical machine 20-*i* from "operating" to "out-of-order" in the physical machine management table 141 (step S103).

The detection unit 11 confirms contents of the information on the occurring fault received from the fault information collection unit 22-*i*, and inputs the confirmed result into the registration unit 12 (step S104). If the occurring fault is not an accidental fault (i.e. persistent fault) (No in step S105), the whole processes are completed. If the occurring fault is an accidental fault (Yes in step S105), the registration unit 12 renews a state of the physical machine 20-*i* from "out-of-order" to "standby" in the physical machine management table 141 (step S106), and the whole processes are completed.

Figure 6:
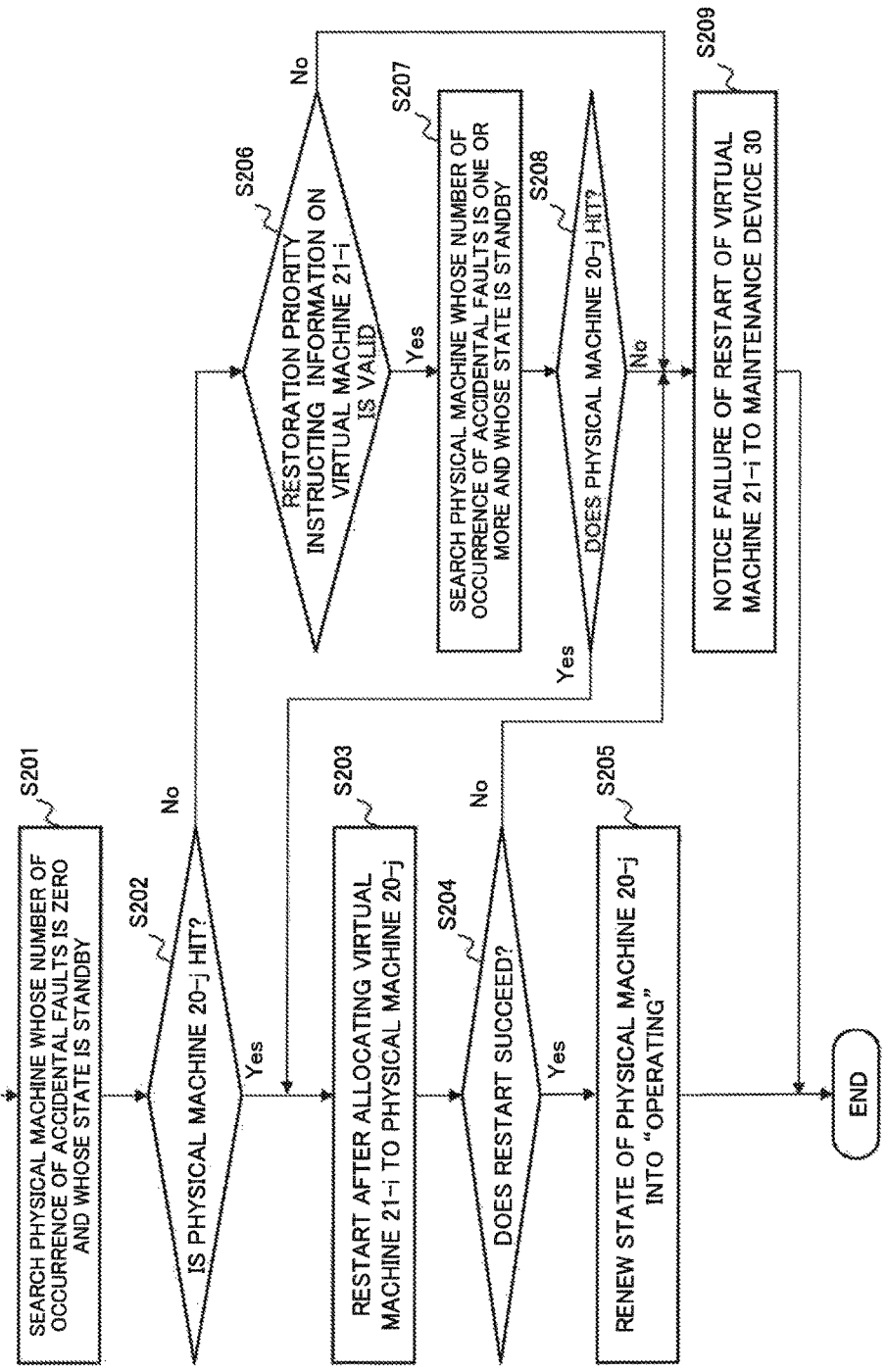
FIG. 6 is a flow chart illustrating an operation in which the virtualization infrastructure management device related to the first example embodiment of the present invention re-allocates a virtual machine which is stopped due to fault occurrence to the physical machine.

By referring to a flowchart in FIG. 6, an operation (process) is described in detail, in which the virtualization infrastructure management device 10 of the example embodiment re-allocates a virtual machine which is stopped due to occurrence of a fault to a physical machine.

After getting the information on a fault on physical machine 20-*i* from the detection unit 11, the allocation unit 13 refers to the physical machine management table 141 and searches a physical machine whose number of occurrence of accidental faults is zero, and whose state is "standby" (step S201). If a physical machine 20-*j* is hit (Yes in step S202), the allocation unit 13 allocates the virtual machine 21-*i* which is stopped due to occurrence of the fault to the physical machine 20-*j*, and restarts the virtual machine 21-*i* (step S203).

If restart of the virtual machine 21-*i* succeeds (Yes in step S204), the registration unit 12 renews a state of the physical machine 20-*j* from "standby" to "operating" in the physical machine management table 141 (step S205), and the whole processes are completed. If restart of the virtual machine 21-*i* fails (No in step S204), the allocation unit 13 notifies the maintenance device 30 of failure of restarting the virtual machine 21-*i* (step S209), and the whole processes are completed.

If no physical machine is hit as a result that the allocation unit 13 searches the physical machine management table 141 (No in step S202), the allocation unit 13 refers to the service management table 140, and confirms whether or not the restoration priority instructing information on the virtual machine 21-*i* is valid. If the restoration priority instructing information on the virtual machine 21-*i* is invalid (No in step S206), the allocation unit 13 performs a process of step S209, and the whole processes are completed.

If the restoration priority instructing information on the virtual machine 21-*i* is valid (Yes in step S206), the allocation unit 13 searches a physical machine whose number of occurrence of accidental faults is one or more than one, and whose state is "standby", in the physical machine management table 141 (step S207). If a physical machine 20-*j* is hit (Yes in step S208), a process in S203 is performed. If no physical machine is hit (No in step S208), the allocation unit 13 performs a process in S209, and the whole processes are completed.

The virtualization infrastructure management system 1 of the example embodiment can effectively use a usable physical machine in a computer system constructing a virtualization environment. That is because, when the detection unit 11 detects that a fault which occurs in a physical machine is an accidental fault, the registration unit 12 registers the physical machine in the management information storage unit 14 as a machine which is in a standby state, and the allocation unit 13 allocates a stopped virtual machine to any one of physical machines which are in a standby state.

An effect which is realized by the virtualization infrastructure management system 1 of the example embodiment is described below in detail.

Generally, faults which occur in a physical machine include a physical persistent fault on hardware and an accidental fault which is not the persistent fault. The physical machine in which the persistent fault occurs cannot be used until maintenance works, for example, exchange of parts in which a fault occurs, etc. are completed. The physical machine in which the accidental fault occurs can be used by, for example, restart, without the above mentioned maintenance works.

In the computer system constructing a virtualization environment, the physical machine in which the accidental fault occurs is usually managed as out-of-order, as well as the physical machine in which the persistent fault occurs. In such computer system, since a virtual machine cannot be allocated to the physical machine in which the accidental fault occurs and which is essentially usable, a usable physical machine cannot be effectively used.

The virtualization infrastructure management device 10 of the example embodiment confirms whether a fault which occurs in a physical machine is a persistent fault or an accidental fault, and manages the physical machine as standby if the accidental fault occurs. The virtualization infrastructure management device 10 newly allocates a virtual machine to the physical machine which is in standby state after occurrence of the accidental fault. Thereby, the virtualization infrastructure management system 1 of the example embodiment effectively uses the usable physical machine.

The management information storage unit 14 of the example embodiment stores information including the number of occurrence of accidental faults on the physical machines 20-1 to 20n as the physical machine management table 141. The virtualization infrastructure management device 10 is capable of allocating a virtual machine to a physical machine whose number of occurrence of accidental faults is the fewest, or to a physical machine whose number of occurrence of accidental faults is equal to or less than a predetermined value. Therefore, the virtualization infrastructure management system 1 of the example embodiment can improve availability by preferentially using a physical machine having low probability of occurrence of a fault.

An advantage is described below, which is obtained when a physical machine to be allocated as criteria is the physical machine whose number of occurrence of accidental faults is not the fewest, but is equal to or less than a predetermined value. In this case, suppose that a particular physical machine whose number of occurrence of accidental faults is the fewest is registered as "standby" in the physical machine management table 141, and is registered later than the other physical machines which are different from the particular physical machine. In such case, it is assumed that a system administrator does not immediately set a virtual machine even if the number of occurrence of accidental faults in the particular physical machine is the fewest, and the system administrator wants to see operating situation of the particular physical machine. That is because it is assumed that the number of occurrence of accidental faults on the particular physical machine may be suddenly increased. In such case, since the system can choose a physical machine more flexibly by using the criteria "equal to or less than the predetermined value", it is possible to make availability of the system more practical.

The management information storage unit 14 of the example embodiment stores restoration priority instructing information on the virtual machines 21-1 to 21-$n$ as the service management table 140. Among services provided by a virtual machines, there are service whose quick restoration is important and service in which it is important that a fault does not occur again after restoration. This difference is based on contents of the service, when the provision of the service is stopped due to a fault.

For example, when the virtual machine provides a service (service A) that frequently receives and processes requests whose amount of information processing is small, influence on the requests frequently received has to be reduced. In this case, therefore, quick restoration of the service is important. If the virtual machine provides a service (service B) that rarely receives and processes requests whose amount of information processing is quite large, it has to be avoided that a fault occurs again before a request requiring long processing time is completed and the previous processing becomes useless.

In this case, therefore, it is important that a fault does not occur again after restoration of the service. In the example embodiment, the restoration priority instructing information is set to be valid with respect to the virtual machine which provides the service A, and is set to be invalid with respect to the virtual machine which provides the service B.

A physical machine in which an accidental fault has occurred has high probability of occurrence of an accidental fault due to the same cause as that of a previous accidental fault, compared with a physical machine in which an accidental fault has not occurred. The virtualization infrastructure management device 10 of the example embodiment therefore adds the physical machine in which an accidental fault has occurred to a target to which a virtual machine is allocated with respect to only the virtual machine whose quick restoration is required and the restoration priority instructing information is valid. That is to say, with respect to a virtual machine whose restoration priority instructing information is invalid, the virtualization infrastructure management device 10 does not target the physical machine in which an accidental fault has occurred, as an object which the virtual machine is allocated to. Thereby the virtualization infrastructure management system 1 of the example embodiment is capable of effectively using the usable physical machine while performing flexible system management considering characteristics of service provided by each virtual machine. With respect to a virtual machine whose restoration priority instructing information is invalid, the virtualization infrastructure management system 1 may not target a physical machine whose number of occurrence of accidental faults is equal to or more than a predetermined value, as an object which the virtual machine is allocated to.

When an accidental fault frequently occurs in a particular physical machine, the accidental fault should be handled as a persistent fault since it is difficult to use the physical machine in system operation. In this case, the registration unit 12 of the example embodiment may register that the physical machine is in a fault state, in the physical machine management table 141, when the number of occurrence of accidental faults in the physical machine is equal to or more than a predetermined value.

The registration unit 12 of the example embodiment may receive information on an amount of unused resource from each physical machine and register the acquired information in the management information storage unit 14. The amount of unused resource is for example the number of unused cores of a processor, unused capacity of memory, unused capacity of a disc, etc. In the case, the allocation unit 13 of the example embodiment has a function of comparing the amount of unused resource with an amount of resource required by an allocated virtual machine with respect to the particular physical machine, in the management information storage unit 14. If the amount of unused resource is equal to or more than the amount of resources required by the allocated virtual machine, the allocation unit 13 may allocate the virtual machine to the physical machine even if the physical machine is in an operating state. Thereby, the virtualization infrastructure management system 1 of the example embodiment effectively uses the usable physical machine.

Second Example Embodiment

Figure 7:
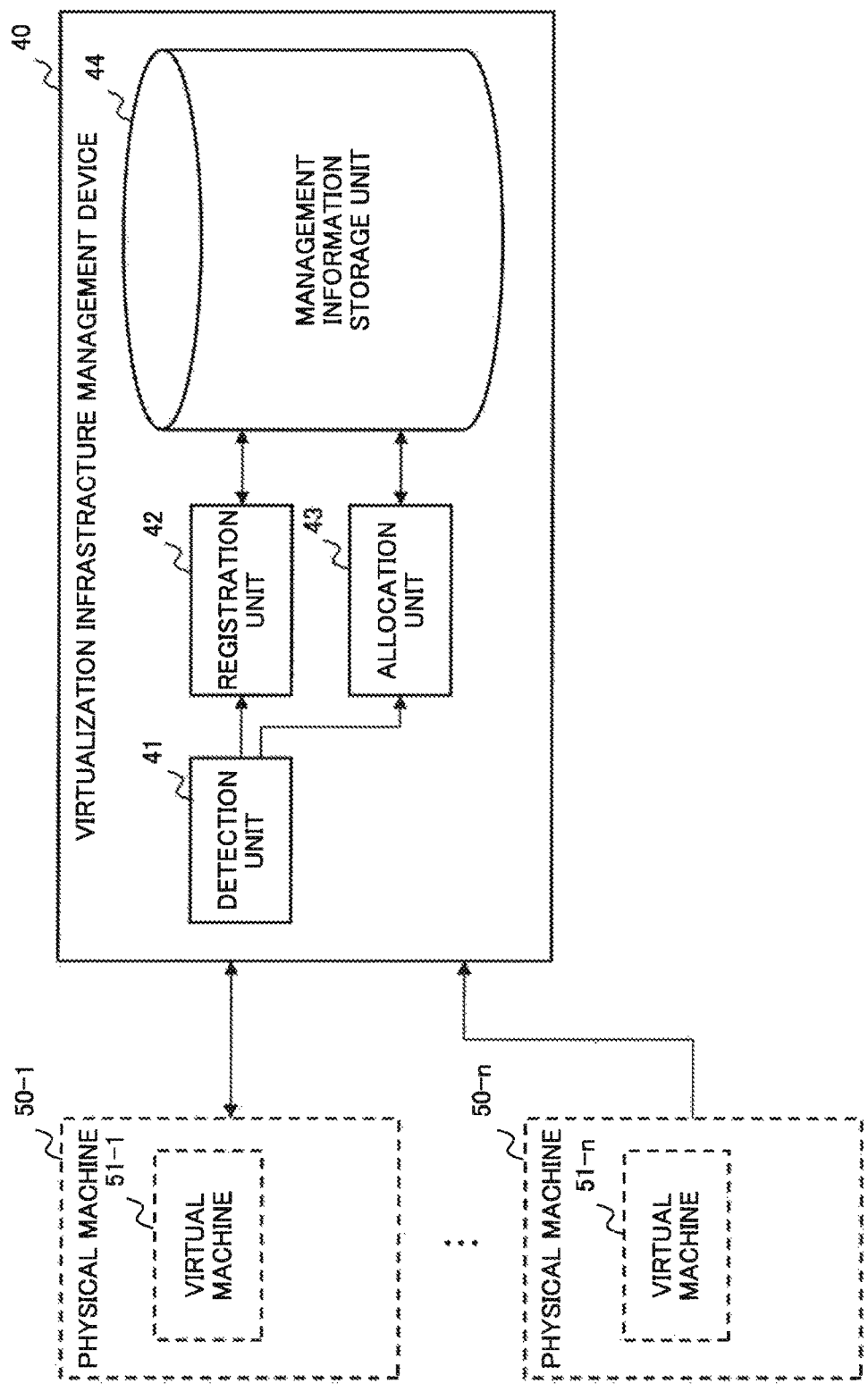
FIG. 7 is a block diagram illustrating a structure of a virtualization infrastructure management device related to a second example embodiment of the present invention.

FIG. 7 is a block diagram schematically illustrating a structure of a virtualization infrastructure management device 40 related to a second example embodiment.

The virtualization infrastructure management device 40 of the second example embodiment includes a detection unit 41, a registration unit 42, an allocation unit 43, and a management information storage unit 44.

The detection unit 41 detects occurrence of an accidental fault which is not a physical persistent fault in the physical machine 50-$i$ ($i$ is an integer which is any one of 1 to n) included in one or more physical machines 50-1 to 50-$n$ which are capable of executing one or more virtual machines. The physical machines 50-1 (50-2 to 50-$n$) executes the virtual machine 51-1 (51-2 to 51-$n$).

The registration unit 42 registers that the physical machine 50-$i$ is in standby state, into the management information storage unit 44 which stores states of the physical machines 50-1 to 50-$n$, when the detection unit 41 detects the accidental fault.

When a fault occurs in a physical machine 50-$j$ ($j$ is an integer which is any one of 1 to n), the allocation unit 43 re-allocates a virtual machine 51-$j$ which is stopped due to the fault to any one of physical machines which is registered as the standby state in the management information storage unit 44.

The virtualization infrastructure management device 40 of the example embodiment can effectively use a usable physical machine in a computer system constructing virtualization environment. The reason is that, when the detection unit 41 detects that a fault which occurs in a physical machine is an accidental fault, the registration unit 42 registers the physical machine in the management information storage unit 44 as a machine which is in a standby state, and the allocation unit 43 allocates a stopped virtual machine to any one of physical machines which are in a standby state.

Example of Hardware Configuration

In the example embodiments, respective parts shown in FIG. 1 and FIG. 7 can be realized by exclusive HW (HardWare) (electronic circuit). The detection units 11, 41, the registration units 12, 42, and the allocation unit 13, 43 can be thought as function (process) units (software module) of software programs. Sections of the respective parts shown in these drawings are a configuration for convenience of explanations, and various configurations can be thought in implementation. An example of hardware environment in this case is explained by referring to FIG. 8.

Figure 8:
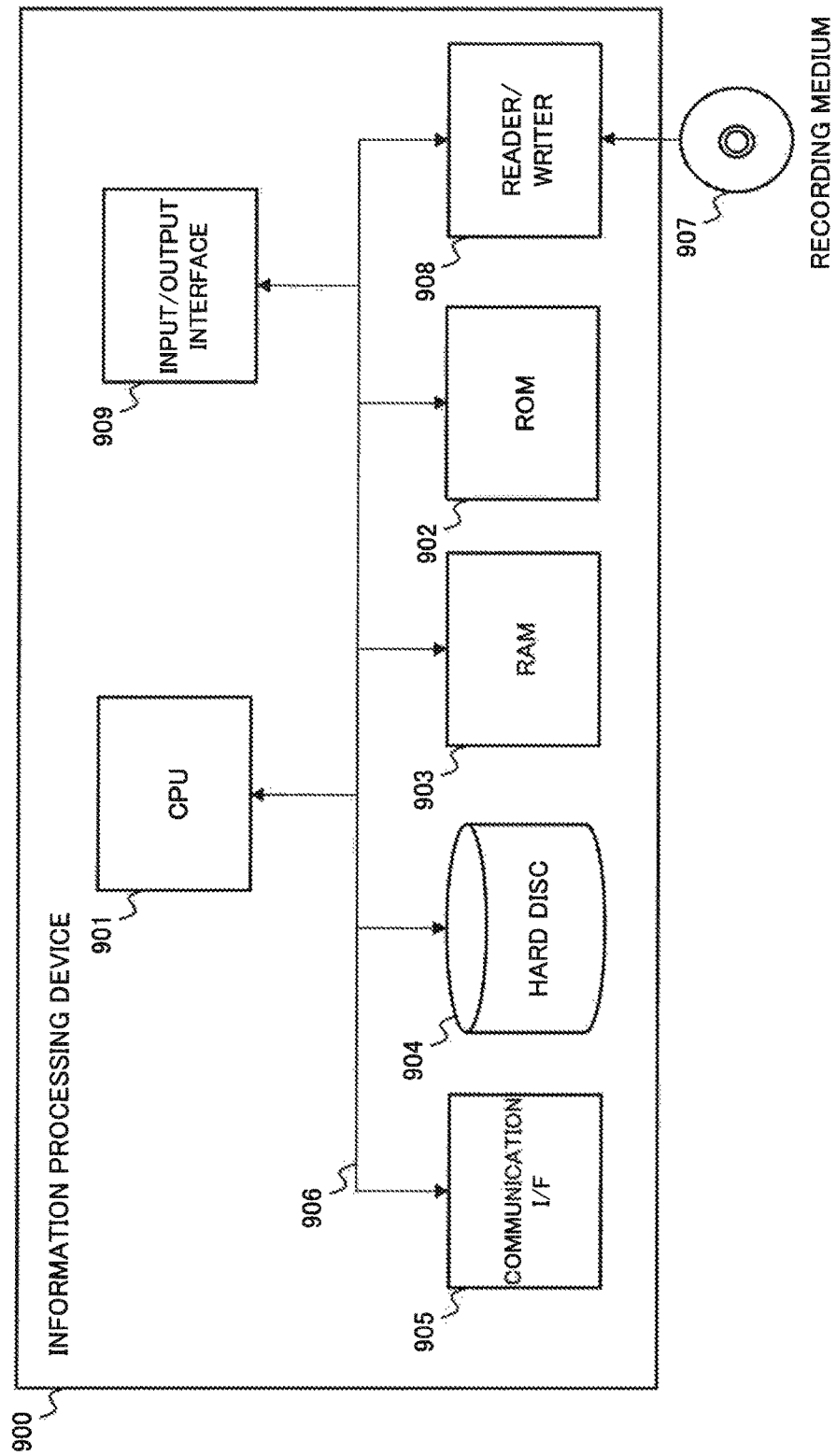
FIG. 8 is a block diagram illustrating a structure of an information processing device which is capable of executing the virtualization infrastructure management devices related to each example embodiment of the present invention.

FIG. 8 is a diagram exemplifying a structure of an information processing device 900 (computer) which is capable of executing the virtualization infrastructure management devices related to an exemplary example embodiment of the present invention. FIG. 8 illustrates a configuration of a computer (information processing device) which is capable of making the virtualization infrastructure management device shown in FIG. 1 and FIG. 7, and represents the hardware environment which is capable of realizing respective functions in the example embodiments above described.

An information processing device 900 shown in FIG. 8 includes following constituents.

CPU 901,
ROM (Read_Only_Memory) 902,
RAM (Random_Access_Memory) 903,
Hard disc 904 (storage device),
Communication interface to External Device 905,
Reader/Writer 908 which can read and write data stored in Recording Medium 907, like CD_ROM (Compact_Disc_Read_Only_Memory),
Input/Output Interface 909,
Bus 906 (Communication Line)

The information processing device 900 with the above constituents is a general computer whose constituents are connected to each other through the bus 906.

The present invention which is exemplified by the example embodiment above described supplies a computer program which is capable of realizing following functions to the information processing device 900 shown in FIG. 8. The functions are functions of the detection units 11, 41, the registration units 12, 42, and the allocation units 13, 43 or the flowchart (FIG. 5 to FIG. 6). The computer program supplied in the device may be stored in a storage device like a readable/writable volatile storage memory (RAM 903) or a non-volatile storage device like a hard disc 904, etc.

In the case above described, general procedures can be used to provide the computer program to the hard ware. The procedures may include, for example, installing it in the device by using various recording mediums 907 like a CD-ROM, etc. or downloading from the outside through a communication line like Internet. In this case, the present invention may be thought to be constructed by codes constructing the computer program, or by the recording medium 907 storing the codes.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-148948, filed on Jul. 22, 2014, the disclosure of which is incorporated herein in its entirety by reference.

REFERENCE SIGNS LIST

1 Virtualization infrastructure management system
10 Virtualization infrastructure management device
11 Detection unit
12 Registration unit
13 Allocation unit
14 Management information storage unit
140 Service management table
141 Physical machine management table
20-1 to 20n Physical machine
21-1 to 21-n Virtual machine
22-1 to 22-n Fault information collection unit
30 Maintenance device
200 State of operation
201 State of out-of order
202 Standby state
40 Virtualization infrastructure management device
42 Detection unit
42 Registration unit
43 Allocation unit
44 Management information storage unit
50-1 to 50-n Physical machine
51-1 to 51-n Virtual machine
900 Information processing device
901 CPU
902 ROM
903 RAM
904 Hard disc
905 Communication interface
906 Bus
907 Recording medium
908 Reader/Writer
909 Input/output interface

The invention claimed is:

1. A virtualization infrastructure management device, comprising:
    detection means for detecting occurrence of an accidental fault which is not a physical persistent fault, in a first physical machine included in one or more physical machines which are capable of executing one or more virtual machines;
    registration means for, when the detection unit detects the accidental fault, registering that the first physical machine is in standby state, in management information storage means for storing states of the physical machines; and
    allocation means for, when a fault occurs in a second physical machine of the one or more physical machines, re-allocating the virtual machine stopped by the fault to any of the physical machines for which the standby state is registered in the management information storage means.

2. The virtualization infrastructure management device of claim 1, wherein
    the registration means registers the number of occurrence of the accidental faults with respect to the physical machines in the management information storage means, and
    the allocation means re-allocates the virtual machine stopped by the fault to the physical machine in which the number of the occurrence of the accidental faults meets predetermined criteria, in the physical machines for which a standby state is registered in the management information storage means.

3. The virtualization infrastructure management device of claim 2, wherein
    the management information storage means stores restoration priority instructing information which indicates whether or not it is valid to give priority to restoration of processing executed by the virtual machine with respect to the virtual machine, and when the restoration priority of the virtual machine stopped by the fault indicates invalidity, the allocation means re-allocates the virtual machine to the physical machine whose number of the occurrence of accidental faults is equal to or less than a first threshold value.

4. The virtualization infrastructure management device of claim 2, wherein the allocation means registers that the first physical machine is in a fault state, when the number of the occurrence of accidental faults is equal to or more than a second threshold value with respect to the first physical machine.

5. The virtualization infrastructure management device of claim 1, wherein the registration means registers information on an amount of unused resource with respect to the physical machines in the management information storage means, and with respect to the physical machine whose amount of unused resource is equal to or more than an amount of resource required by the virtual machine in the management information storage means, the allocation means is capable of re-allocating the virtual machine stopped by the fault to the physical machine, even if the physical machine is in an operating state.

6. The virtualization infrastructure management device of claim 5, wherein with respect to the physical machine, the registration means registers at least one of the number of unused processor cores, unused memory capacity, and unused disc capacity in the management information storage means, as information on the amount of unused resource.

7. The virtualization infrastructure management device of claim 1, wherein the detection means determines that the accidental fault occurs in the first physical machine, when logical inconsistency included in software executed by the virtual machine exists, when power supply to the first physical machine is stopped, or when the virtual machine stops due to abnormality of temperature which is generated in the first physical machine.

8. A virtualization infrastructure management system, comprising:

the virtualization infrastructure management device of claim 1; and the one or more physical machines.

9. A virtualization infrastructure management method, comprising:

detecting occurrence of an accidental fault which is not a physical persistent fault, in a first physical machine included in one or more physical machines which are capable of executing one or more virtual machines;

when the accidental fault is detected, registering that the first physical machine is in standby state, in management information storage means for storing states of the physical machines; and when a fault occurs in a second physical machine of the one or more physical machines, re-allocating the virtual machine stopped by the fault to any of the physical machines for which the standby state is registered in the management information storage means.

10. A non-transitory computer readable recording medium for recording virtualization infrastructure management program for causing a computer to execute following processes:

a detection process to detect occurrence of an accidental fault which is not a physical persistent fault, in a first physical machine included in one or more physical machines which are capable of executing one or more virtual machines;

a registration process to register, when the detection unit detects the accidental fault, that the first physical machine is in standby state, in management information storage means for storing states of the physical machines; and an allocation process to re-allocate, when a fault occurs in a second physical machine of the one or more physical machines, the virtual machine stopped by the fault to any of the physical machines for which the standby state is registered in the management information storage means.

11. The virtualization infrastructure management device of claim 3, wherein the allocation means registers that the first physical machine is in a fault state, when the number of the occurrence of accidental faults is equal to or more than a second threshold value with respect to the first physical machine.

12. The virtualization infrastructure management device of claim 2, wherein the registration means registers information on an amount of unused resource with respect to the physical machines in the management information storage means, and with respect to the physical machine whose amount of unused resource is equal to or more than an amount of resource required by the virtual machine in the management information storage means, the allocation means is capable of re-allocating the virtual machine stopped by the fault to the physical machine, even if the physical machine is in an operating state.

13. The virtualization infrastructure management device of claim 3, wherein the registration means registers information on an amount of unused resource with respect to the physical machines in the management information storage means, and with respect to the physical machine whose amount of unused resource is equal to or more than an amount of resource required by the virtual machine in the management information storage means, the allocation means is capable of re-allocating the virtual machine stopped by the fault to the physical machine, even if the physical machine is in an operating state.

14. The virtualization infrastructure management device of claim 4, wherein the registration means registers information on an amount of unused resource with respect to the physical machines in the management information storage means, and with respect to the physical machine whose amount of unused resource is equal to or more than an amount of resource required by the virtual machine in the management information storage means, the allocation means is capable of re-allocating the virtual machine stopped by the fault to the physical machine, even if the physical machine is in an operating state.

15. The virtualization infrastructure management device of claim 2, wherein the detection means determines that the accidental fault occurs in the first physical machine, when logical inconsistency included in software executed by the virtual machine exists, when power supply to the first physical machine is stopped, or when the virtual machine stops due to abnormality of temperature which is generated in the first physical machine.

16. The virtualization infrastructure management device of claim 3, wherein
the detection means determines that the accidental fault occurs in the first physical machine, when logical inconsistency included in software executed by the virtual machine exists, when power supply to the first physical machine is stopped, or when the virtual machine stops due to abnormality of temperature which is generated in the first physical machine.

17. The virtualization infrastructure management device of claim 4, wherein
the detection means determines that the accidental fault occurs in the first physical machine, when logical inconsistency included in software executed by the virtual machine exists, when power supply to the first physical machine is stopped, or when the virtual machine stops due to abnormality of temperature which is generated in the first physical machine.

18. The virtualization infrastructure management device of claim 5, wherein
the detection means determines that the accidental fault occurs in the first physical machine, when logical inconsistency included in software executed by the virtual machine exists, when power supply to the first physical machine is stopped, or when the virtual machine stops due to abnormality of temperature which is generated in the first physical machine.

19. The virtualization infrastructure management device of claim 6, wherein
the detection means determines that the accidental fault occurs in the first physical machine, when logical inconsistency included in software executed by the virtual machine exists, when power supply to the first physical machine is stopped, or when the virtual machine stops due to abnormality of temperature which is generated in the first physical machine.

20. A virtualization infrastructure management system, comprising:
the virtualization infrastructure management device of claim 2; and
the one or more physical machines.

* * * * *